United States Patent [19]

Bahm, III et al.

[11] Patent Number: 5,606,623
[45] Date of Patent: Feb. 25, 1997

[54] OVERHEAD VEHICULAR LOUD SPEAKER CABINET

[75] Inventors: Jackson L. Bahm, III, Bloomfield Hills; Mark J. Bartlett, Lakeport; Daniel K. Hinske, Canton, all of Mich.

[73] Assignee: Top Source Technologies, Palm Beach Gardens, Fla.

[21] Appl. No.: 462,782

[22] Filed: Jun. 5, 1995

Related U.S. Application Data

[63] Continuation of Ser. No. 59,824, May 7, 1993, abandoned.

[51] Int. Cl.$^6$ .................................. H04R 25/00
[52] U.S. Cl. ........................ 381/86; 381/188; 381/205; 181/144; 181/148
[58] Field of Search ....................... 381/86, 205, 188, 381/152, 87, 88, 90; 181/141, 148, 144, 150

[56] References Cited

U.S. PATENT DOCUMENTS 4,099,026  7/1978  Persson et al. ................ 181/144
4,100,372  7/1978  Hypolite.
4,673,056  6/1987  Koppelomaki.
5,094,316  3/1992  Rosen.

Primary Examiner—Sinh Tran

[57] ABSTRACT

A vehicular loud speaker cabinet assembly (20) attaches beneath the headliner portion (180) of the vehicular roof and is supported thereagainst in various ways. The vehicle (24) may include a structural roof member (22) interconnecting the respective B pillars (54) such as common in small recreational vehicles. The cabinet assembly (20) for this vehicle (24) includes forward and rearward edge rims (36, 38) which are received along the pinch weld portions (60) of the structural roof member (22) and are functionally and decoratively secured thereto by a moisture seal (62). Alternatively, the cabinet assembly (120, 220) may be provided with threaded fasteners (184, 284) which extend upwardly through the cabinet assembly (120, 220) for anchorage above the headliner portion (180) of the vehicular roof. The threaded fasteners (178) may be used to secure the original equipment dome/cargo light assembly (170) in place. The cabinet assembly (120) includes two spaced ends (134) provided each with curved flanges (152) for retention above the side garnish molding (174) of the vehicle (124).

7 Claims, 7 Drawing Sheets

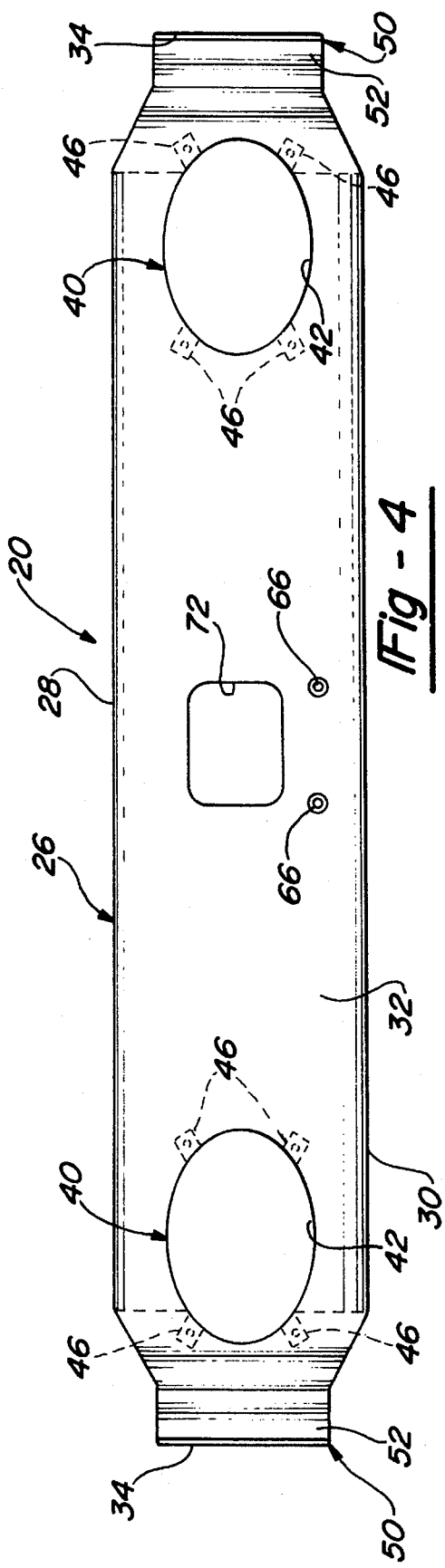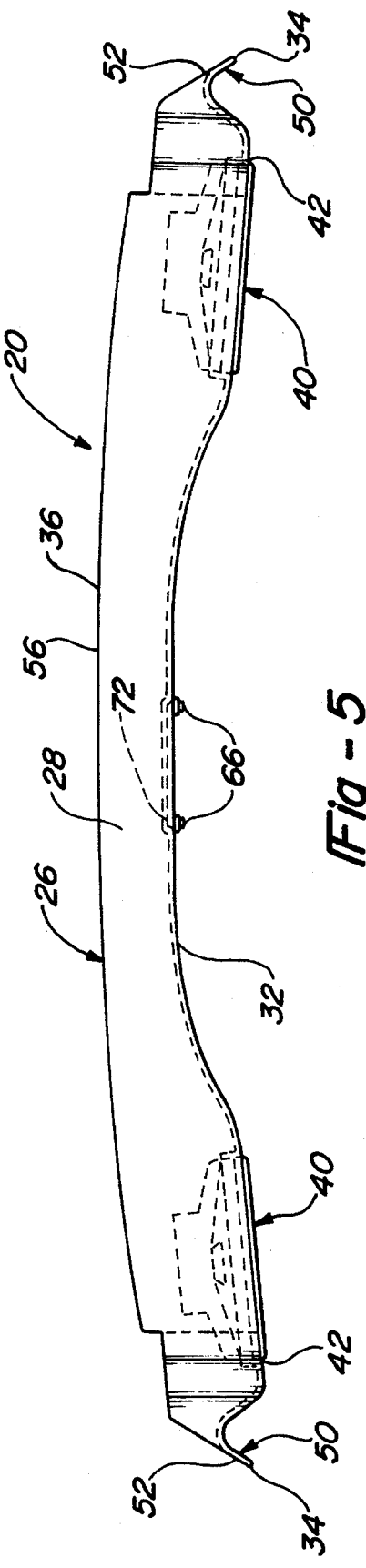

OVERHEAD VEHICULAR LOUD SPEAKER CABINET

This is a continuation of application Ser. No. 08/059,824 filed on May 7, 1993, now abandoned.

TECHNICAL FIELD

The subject invention relates to an overhead speaker system for use in automobiles, and more particularly to a cabinet assembly including at least one loud speaker mounted therein and supported adjacent the vehicular roof.

BACKGROUND ART

Most, if not all, production vehicles today include a basic factory installed sound system. Of course, the purchaser of a vehicle may designate at extra cost an optional original equipment manufacture (OEM) sound system providing greater sound reproduction capabilities than the basic system. However, even the most expensive OEM sound systems are not adequate for the tastes of many music connoisseurs.

As a result, music connoisseurs are frequently drawn to professional aftermarket vehicular sound system businesses which provide and install the most technologically advanced sound systems available. Unfortunately, such aftermarket sound system upgrades require professional and/or tedious installation procedures almost always permanently altering the interior of the vehicle to accommodate the additional and larger loud speakers, etc. It will be readily appreciated that once aftermarket sound system upgrades have been incorporated into a vehicle, future changes to the sound system are always complicated by the permanent alternations previously made to the vehicle interior.

The prior art teaches overhead vehicular loud speaker cabinet assemblies which do not physically damage the interior of the vehicle, or if any alteration is required, it is deminimis. For example, U.S. Pat. Nos. 4,099,026 to Persson et al, issued Jul. 4, 1978 and 4,673,056 to Koppelomaki, issued Jun. 16, 1987, disclose monolithic loud speaker cabinet assemblies for overhead vehicular installation. These cabinet assemblies include curved flanges at the lateral ends thereof to accommodate the well known garnish molding installation practice. Although the loud speaker cabinet assemblies disclosed in these patents function satisfactorily, certain improvements thereto would be desired. For example, the center or mid portions of these cabinet assemblies are not proximally supported by the vehicular roof. Failure to support the mid portion of the cabinet assembly frequently yields an unsightly gap along the headliner, which gap is prone to enlargement over time. Additionally, the unsupported mid portion of the cabinet assembly allows flexure of the cabinet assembly which may, over time, compromise the structural integrity of the cabinet assembly and accelerate premature failure of the loud speakers.

This problem of lacking support for the mid portion of the cabinet assembly has been addressed in U.S. Pat. No. 5,094,316 to Rosen, issued Mar. 10, 1992 and assigned to the assignee of the subject invention. The Rosen patent discloses additional fastening elements extending between the mid portion of the cabinet assembly and a cross bar of the vehicle to diminish the flexure of the cabinet assembly which would otherwise lead to structural compromise and premature loud speaker failure. The cabinet assembly disclosed in the Rosen patent is well adapted for use in recreational and off-road vehicles such as Jeeps® and the like where a cross bar is available on which to connect the fastening elements supporting the mid portion of the cabinet assembly. However, the cabinet assembly disclosed in the Rosen patent is not readily adaptable to cross bar-less vehicles having a headliner, where the visual impact of a noticeable gap between the cabinet assembly and the headliner/roof of the vehicle is of concern.

SUMMARY OF THE INVENTION AND ADVANTAGES

A loud speaker cabinet assembly is provided for attachment to a vehicular overhead structural roof member. The cabinet assembly comprises housing means disposed beneath the structural roof member of the vehicle. The housing means includes elongated forward and rearward edge rims. A loud speaker is supported in the housing means. An intermediate mounting means is coextensive with at least one of the forward and rearward edge rims for connecting that one of the forward and rearward edge rims directly to the structural body member continuously along the respective length to rigidify the housing means and protect the loud speaker from vibratory damage while simultaneously masking any gaps between the housing means and the structural roof member.

Additionally, the subject invention contemplates a loud speaker cabinet assembly for attachment beneath the headliner portion of a vehicular roof and supported between the vehicular side garnish moldings. The cabinet assembly comprises a housing means for disposition beneath the vehicular headliner. The housing means includes a bottom face and two spaced ends. A loud speaker extends through the bottom face. End mounting means is provided on each of the ends for supporting the housing means from the side garnish moldings and beneath the headliner. An aperture is created in the bottom surface generally midway between the ends of the housing means. Fastener means is received in the aperture for applying a force against the bottom face of the housing means to aesthetically fit and structurly maintain the housing means contiguous the headliner and to rigidify the housing means to protect the loud speaker from vibratory damage.

In both manifestations of the subject invention, the middle portion of the housing means is proximally supported by the headliner and/or a structural roof member of the vehicle so as to eliminate any unsightly gaps at the top of the housing means, and also to rigidify the housing means so that the loud speaker is not prematurely damaged by vibration. Therefore, the subject invention improves upon the prior art by providing an overhead loud speaker cabinet assembly which possesses remarkable structural integrity while enhancing the visual impact and aesthetics of the cabinet assembly by eliminating any noticeable gaps between the cabinet assembly and the headliner/roof of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a bottom view of the cabinet assembly;

FIG. 5 is a front elevational view of the cabinet assembly;

DETAILED DESCRIPTION OF THE PREFERRED EMBODIMENT OF FIGS. 1–5

Figure 1:
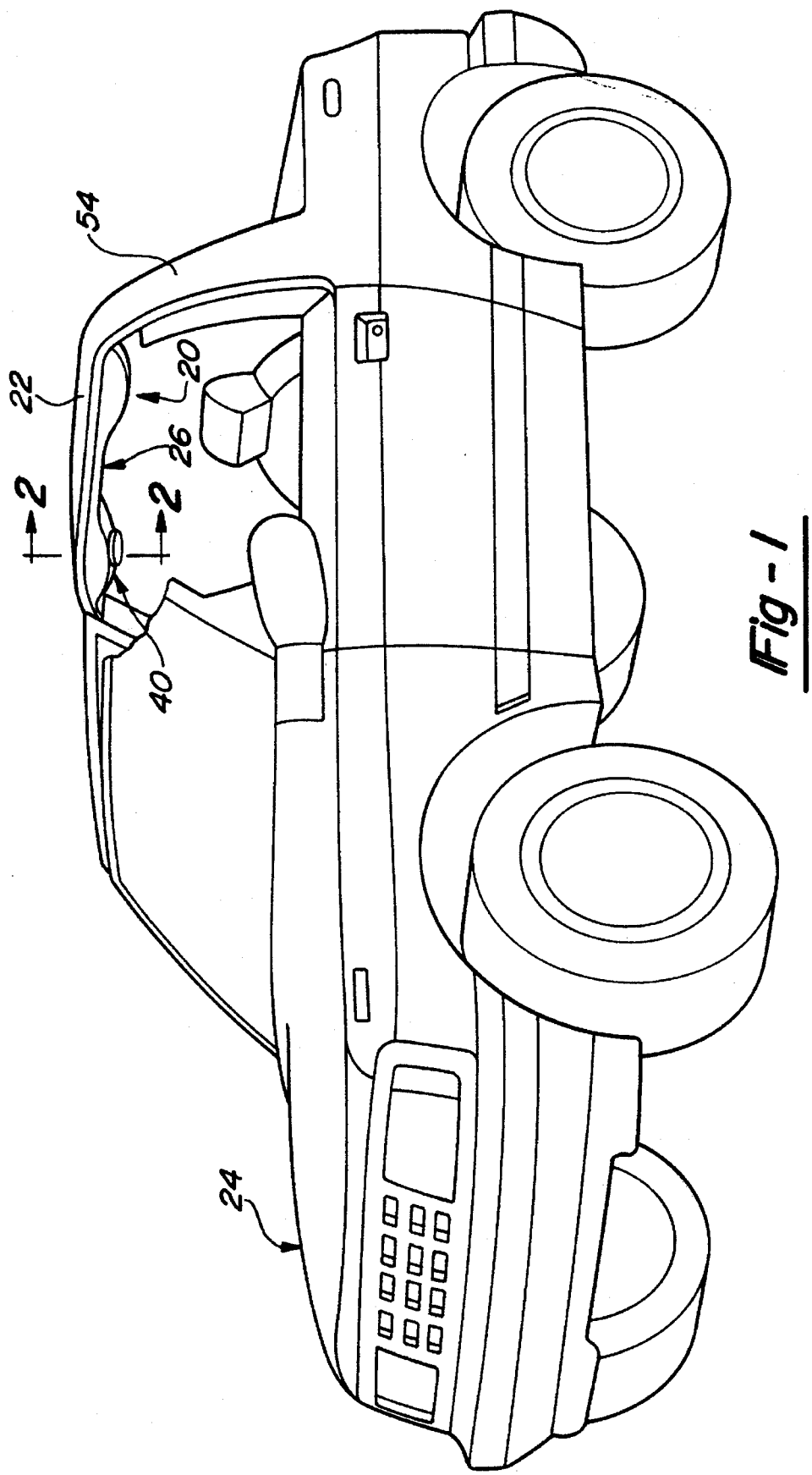
FIG. 1 is a simplified perspective view of a vehicle having installed a first embodiment of the subject loud speaker cabinet assembly.

Referring to the Figures, wherein like numerals indicate like or corresponding parts throughout the several views, a loud speaker cabinet assembly according to the subject invention is generally shown at 20. The cabinet assembly 20 is of the type adapted for attachment to a vehicular overhead structural roof member 22, such as the B pillar cross bar of a vehicle, generally indicated at 24. The specific construction of the cabinet assembly 20 as illustrated in FIGS. 1–5 is particularly suited for fixation in a GEO™ Tracker™.

The cabinet assembly 20 includes housing means, generally indicated at 26, for disposition beneath, or subjacent, the structural roof member 22. The housing means 28 includes a forward face 28, a rearward face 30, and a bottom face 32 interconnecting the forward face 28 and the rearward face 30 to form a somewhat U-shaped structure as illustrated in the cross section of FIG. 2. The housing means 26 includes two spaced ends 34. The upper extremities of the forward face 28 and rearward face 30 are provided with forward 36 and rearward 38 edge rims, respectively, extending continuously between the two ends 34.

Preferably, the housing 26 is fabricated from a unitary thin-walled structure of synthetic composition. A fiber glass type composite material has been found to provide satisfactory structural characteristics with reduced weight. The exterior surfaces of the housing means 26 may be provided with a felted or fuzzy cloth-like texture having a look, feel and color consistency similar to the headliner or other interior trim portion of the vehicle 24. Suitable results have been achieved using an S-RIM manufacturing process.

A loud speaker, generally indicated at 40, is supported in the housing means 26 extending through an opening 42 in the bottom face 32. Preferably, the opening 42 is provided with an upwardly turned flange 44, as shown in FIG. 5, for abutting a land about a grill portion of the loud speaker 40. The loud speaker 40 may also include a plurality of mounting tabs 46 projecting radially outwardly and provided with an opening to receive a threaded fastener (not shown) secured to an embossment 48 on the upper surface of the bottom face 32. The loud speaker 42 is installed in the housing means 26 from the top, i.e., in a downward direction, so as to conceal all mounting hardware and thereby provide a smooth appearance.

Figure 3:
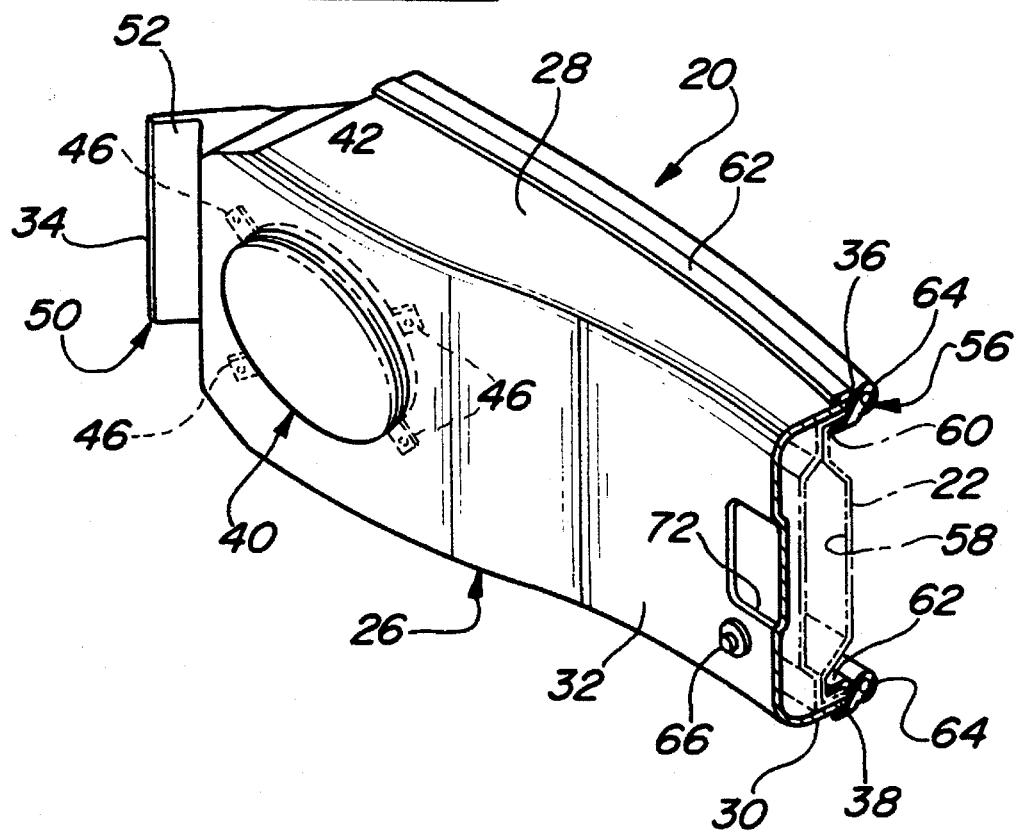
FIG. 3 is a fragmentary perspective view of the cabinet assembly.

End mounting means, generally indicated at 50, is provided for attaching each of the ends 34 of the housing means 26 to the structural roof member 22. The end mounting means 50 comprises a curved flange 52 extending from each of the ends 34, as best shown in FIGS. 3 and 5. The angular orientation of the curved flanges 52 is designed to precisely match the inner vehicular contour where the structural roof member 22 adjoins the B pillars 54. The curved flanges 52 can be mounted in one of two ways. If the vehicle 24 is provided with interior garnish molding along the roof perimeter, the curved flanges 52 can be inserted behind such garnish molding (not shown) in a captured fashion. Alternatively, if the garnish molding is not available, the curved flanges 52 can be secured to the junction between the structural roof member 22 and B pillar 54 using threaded fasteners or the like, as shown in FIG. 1.

Figure 2:
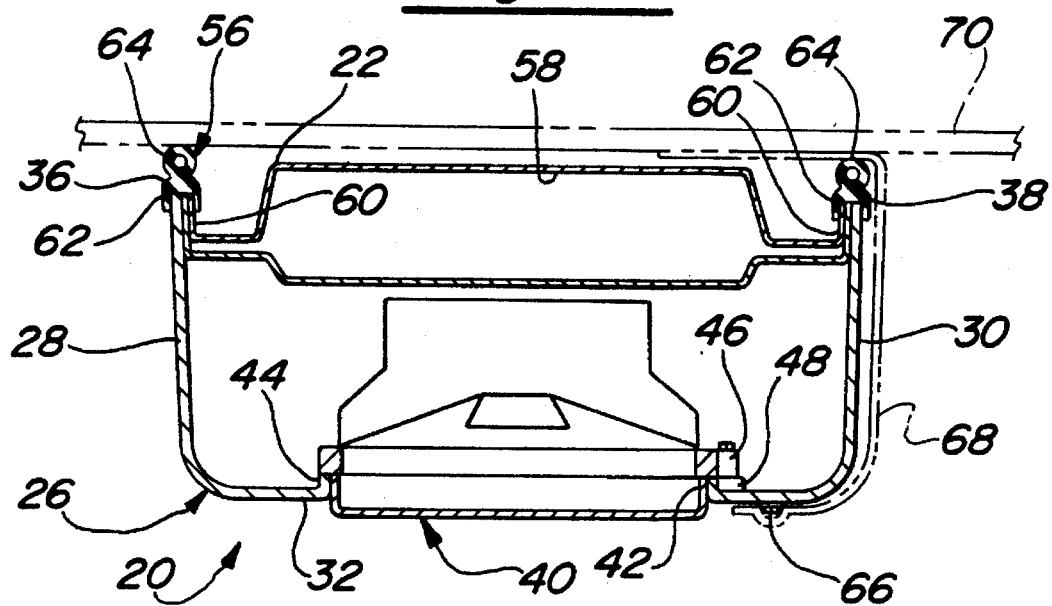
FIG. 2 is a cross-sectional view of the cabinet assembly as taken along lines 2—2 of FIG. 1.

In addition to the end mounting means 50, intermediate mounting means, generally indicated at 56, is coextensive with each of the forward 36 and rearward 38 edge rims for connecting the forward 36 and rearward 38 edge rims directly and proximally to the structural roof member 22 continuously along their respective lengths to rigidify the housing means 26 and protect the loud speaker 40 from vibratory damage. More particularly, as best shown in FIG. 2, the structural roof member 22 in the GEO Tracker vehicle 24, for example, is formed by a pair of sheet metal stampings having a hollow central portion 58 and a pair of L-shaped pinch weld flanges 60 extending along the forward and rearward sides of the hollow central portion 58. The pinch weld flanges 68 are provided with a 90° upward bend.

The housing means 26 is constructed so that the forward face 28 and rearward face 30 straddle the structural roof member 22 with the forward edge rim 36 and rearward edge rim 38 terminating in a substantially flush orientation with the extremities of the pinch weld flanges 60. This relationship between the housing means 26 and the structural roof member 22 provides a significant degree of forward/rearward rigidity to the cabinet assembly 20.

A U-shaped rubber channel 62 is fitted over the forward edge rim 36 and pinch weld flange 60 while a second U-shaped channel 62 is fitted over the rearward edge rim 38 and the corresponding pinch weld flange 60. The U-shaped channels 62 retain the middle or central portion of the housing means 26 in proper orientation relative to the structural roof member 22 to rigidify the housing means 26 and reduce the incidence of vibration in the assembly 20. Preferably, the U-shaped channels 62 are of identical construction and each include a compressible moisture seal 64 along the upper edge thereof. The moisture seals 64 are tubular in nature having a generally circular cross section, as shown in FIG. 2.

The bottom face 32 of the housing 26 may be provided with one or more press-fit snap connectors 66 for attaching a tie down 68 (in phantom) extending integrally from a fabric top 70 (in phantom) of the vehicle 24. Also, as best shown in FIGS. 3, 4 and 5, the bottom face 32 may include a dome/cargo light recess 72 for receiving an optional dome/cargo light device (not shown) in a manner similar to that described below.

DETAILED DESCRIPTION OF THE ALTERNATIVE EMBODIMENT OF FIGS. 6–8

Figure 6:
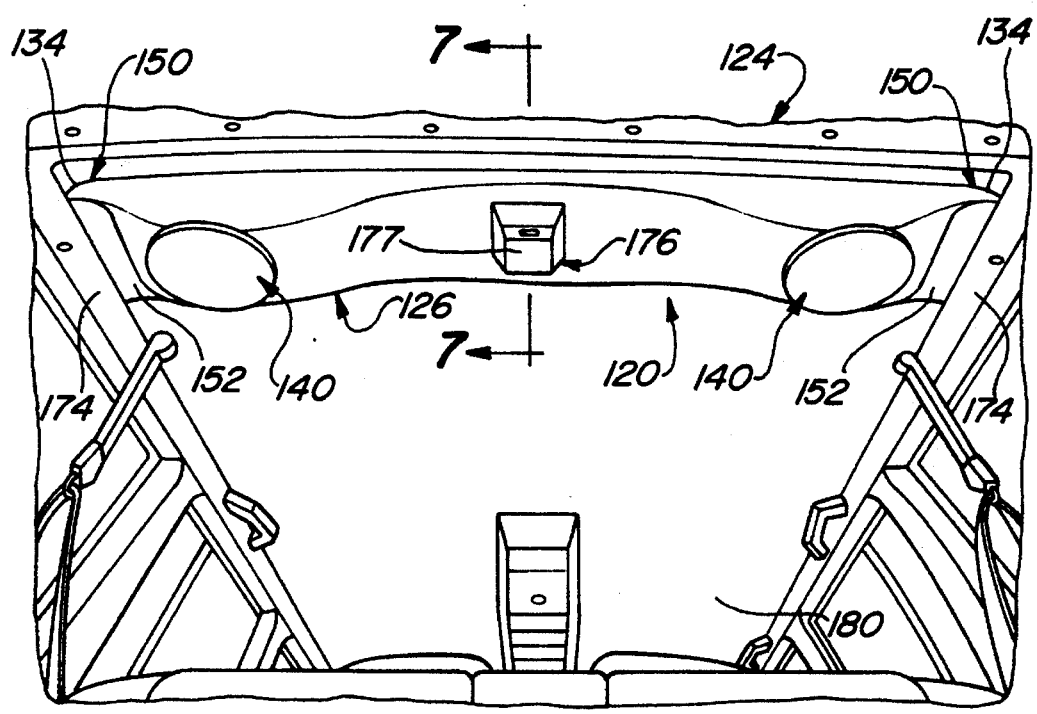
FIG. 6 is a fragmentary perspective view showing a second embodiment of the invention installed in a vehicle.
Figure 7:
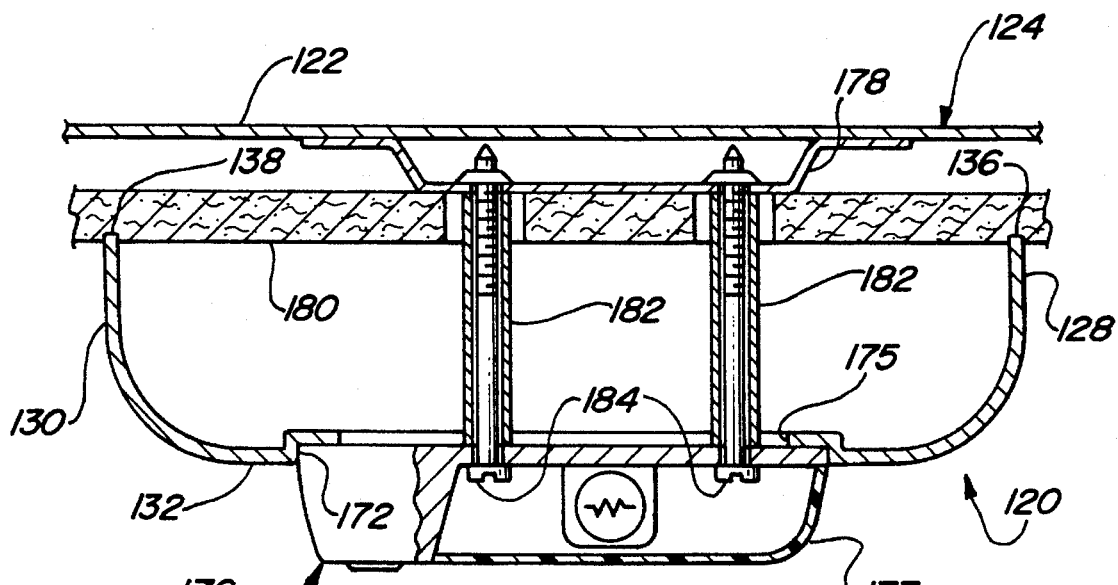
FIG. 7 is a cross-sectional taken substantially along lines 7—7 of FIG. 6.
Figure 8:
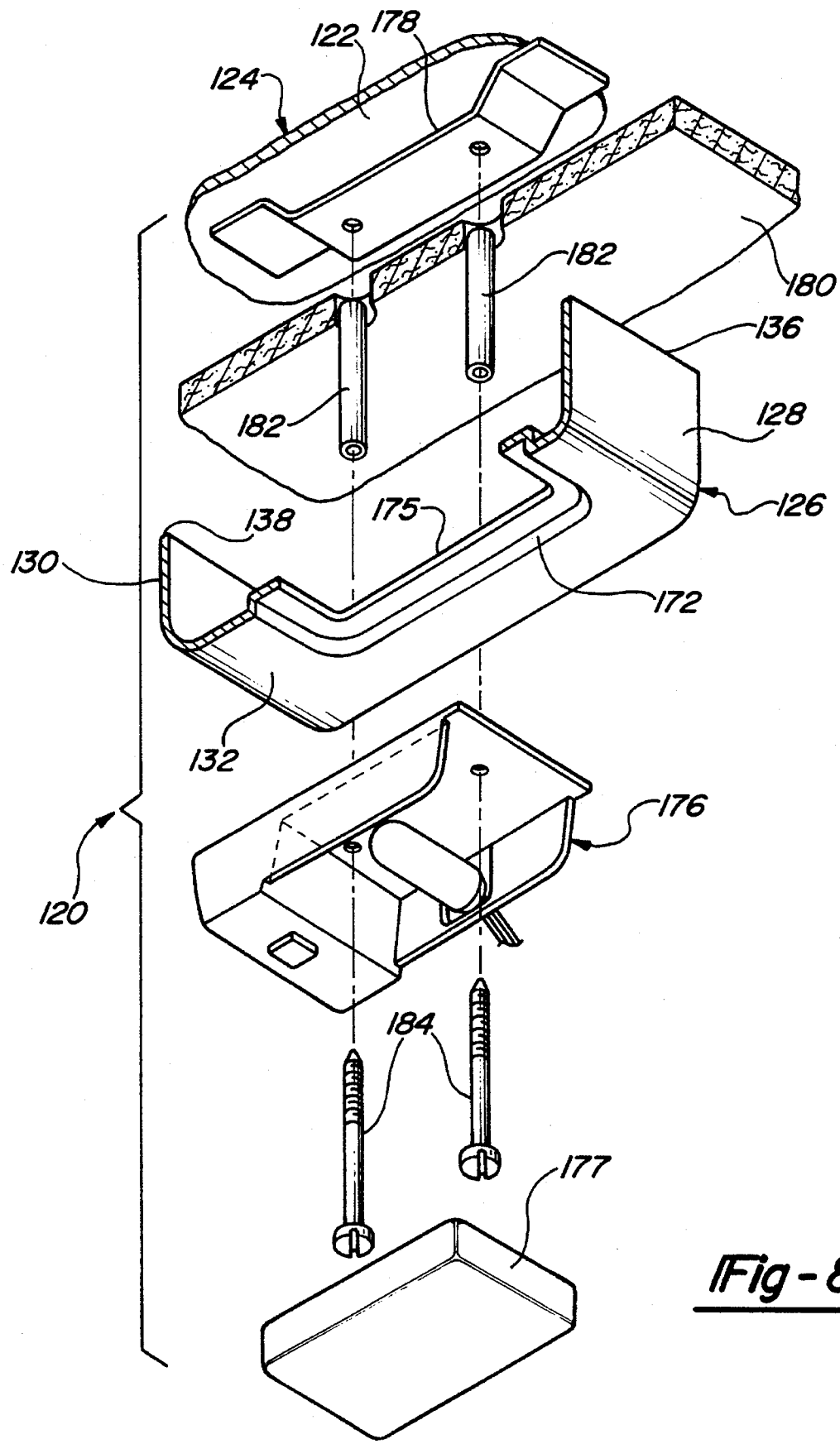
FIG. 8 is a partially sectioned and exploded view of the cabinet assembly of FIG. 7.

For convenience, structural features of the embodiment of FIGS. 6–8 corresponding in function to structural features described in connection with FIGS. 1–5 above are referenced using like reference numerals preceded by the numerical prefix "1". The invention as shown in FIGS. 6–8 is primarily intended for use in vehicles 124 having enclosed interior compartments with an OEM dome/cargo light affixed to the interior roof, such as the Jeep® Cherokee XJ (trademark of the Chrysler Corporation).

In this embodiment, the cabinet assembly 120 is shown including housing means 126 having a smoothly contoured bottom face 132, forward face 128, and rearward face 130. Two loud speakers 140 extend through the bottom face 132 in a manner similar to that described above in connection with FIGS. 1–5. The housing means 126 is provided with end mounting means 150 comprising curved flanges 152 at the respective ends 134 of the housing means 126. The curved flanges 152 are seated behind garnish moldings 174 of the right and left sides of the vehicle 124.

According to this embodiment, however, the intermediate mounting means 156 takes a dramaticly different form from that described above in connection with FIGS. 1–5. OEM mounting structure provided for an OEM dome/cargo light assembly, generally indicated at 176, is used to support the middle or central portion of the housing means 126. The roof 122 of the vehicle 124 is provided from the factory with a mounting bracket 178 having a pair of spaced threaded openings for receiving two mounting posts of the dome/cargo light assembly 176. The cabinet assembly 120 includes a recess 172 for receiving the dome/cargo light assembly 176. The recess 172 surrounds an aperture 175 in the bottom face 132, through which the dome/cargo light assembly 176 is inserted during the installation process.

During dealership or aftermarket installation of the cabinet assembly 120, a plastic cover 177 is removed from the dome/cargo light assembly 176 to reveal the heads of two OEM mounting posts (not shown). These OEM mounting post and push-fit keepers are removed and discarded, after which the dome/cargo light assembly 176 is pulled away from a headliner 180. The cabinet assembly 120 is then moved into position with the curved flanges 152 being inserted behind the garnish moldings 174 as described above. The dome/cargo light assembly 176 is positioned within the recess 172, as shown in FIGS. 7 and 8. During this step, a pair of tubular spacers 182 are inserted through the headliner 180 and aligned with the threaded holes in the mounting bracket 178. The dome/cargo light assembly 176 is then reinstalled with a pair of long mounting screws 184 passing through the spacers 182 and threadably received into the mounting bracket 178. The spacers 182 prevent overtightening of the long mounting screws 184, however permit the forward 136 and rearward 138 edge rims to gently bare into the headliner 180 so as to eliminate unsightly gaps thereby providing an aesthetically pleasing appearance.

Alternatively, if the cabinet assembly is factory installed, longer OEM mounting posts can be installed in the bracket 178 which extend through the dome/cargo light assembly 176 as positioned in the recess 172. Then, to retain the dome/cargo light assembly 176 in place, push-fit keepers are placed on the mounting posts in the usual manner.

By utilizing the dome/cargo light assembly 176 and associated OEM mounting structure, the cabinet assembly 120 is rigidified along its mid portion to protect the loud speakers 140 from vibratory damage and eliminate gaps between the housing means 126 and the headliner 180 thereby creating a pleasant visual impact.

DETAILED DESCRIPTION OF THE ALTERNATIVE EMBODIMENT OF FIGS. 9 AND 10

Figure 9:
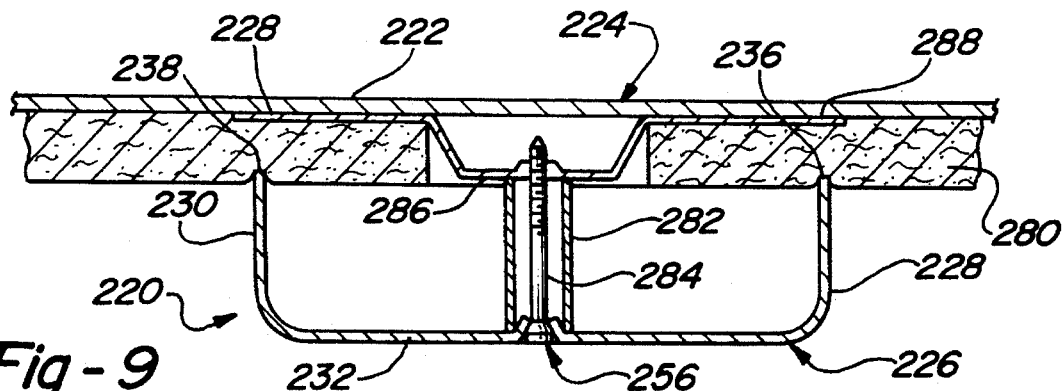
FIG. 9 is a cross-sectional view of a third embodiment of the invention.
Figure 10:
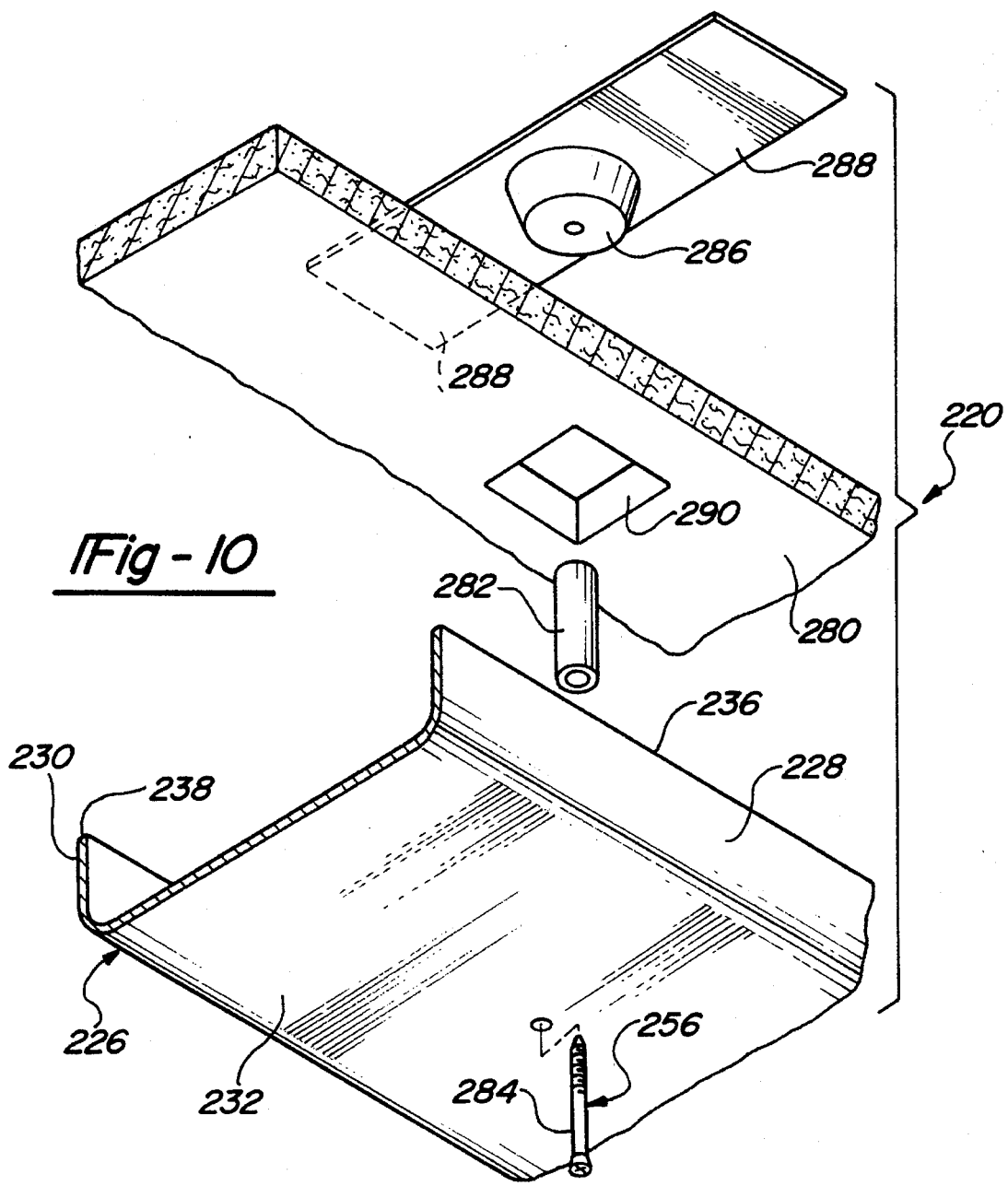
FIG. 10 is a fragmentary exploded view of the cabinet assembly shown in FIG. 9.

A second alternative embodiment of the subject cabinet assembly is shown in FIGS. 9 and 10, with like or corresponding structural features being referenced with consistent reference numbers to those used above, and preceded with the numerical prefix "2".

In the embodiment of FIGS. 9 and 10, only a fragment of the cabinet assembly 220 is illustrated, that being in the area of the intermediate mounting means 256. In this configuration, it is assumed that the vehicle 224 is provided neither with a structural roof member 22 as described in connection with FIGS. 1–5 nor a mounting bracket 178 is described in connection with FIGS. 6–8. Under these circumstances, there is no available OEM mounting structure with which to support the mid portion of the housing means 226. Therefore, a nut 286 is provided with a pair of extended arms 288. The nut 286 is installed between the headliner 280 and a standard roof 222, through an opening 290 formed in the headliner 280. A tubular spacer 282 is positioned between the nut 286 and the upper surface of the bottom face 232 to prevent overtightening of the mounting screw 284. As best shown in FIG. 9, the arms 288 are sized to extend beyond the outer reaches of the forward 236 and rearward 238 edge rims so that as the mounting screw 284 is tightened, the respective edge rims 236, 238, are drawn into tight contact with the headliner 280 thereby eliminating any visible gaps while proximally supporting the middle portion of the housing means 226.

DETAILED DESCRIPTION OF THE ALTERNATIVE EMBODIMENT OF FIGS. 11–13

Figure 11:
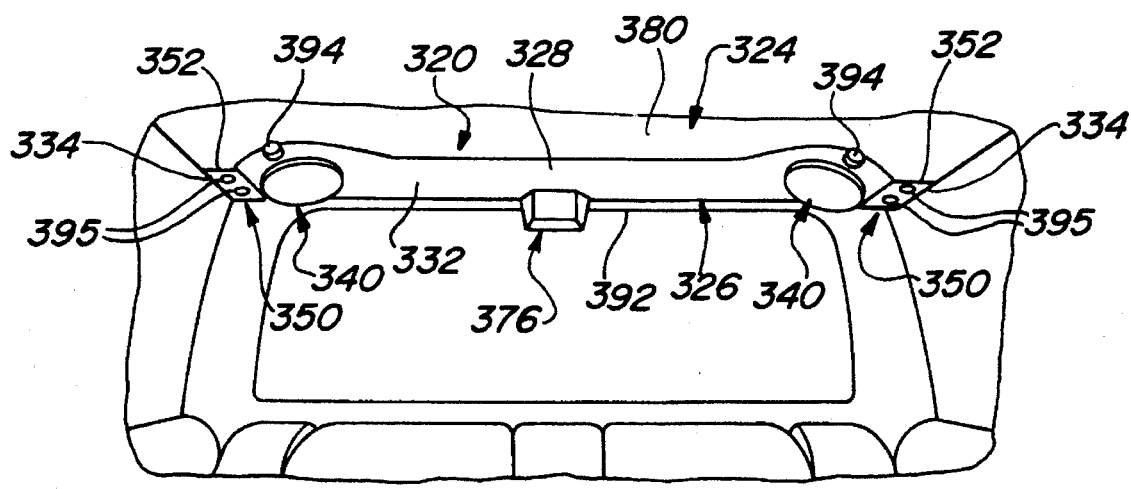
FIG. 11 is a fragmentary perspective view of a fourth embodiment of the subject invention installed in a vehicle.
Figure 12:
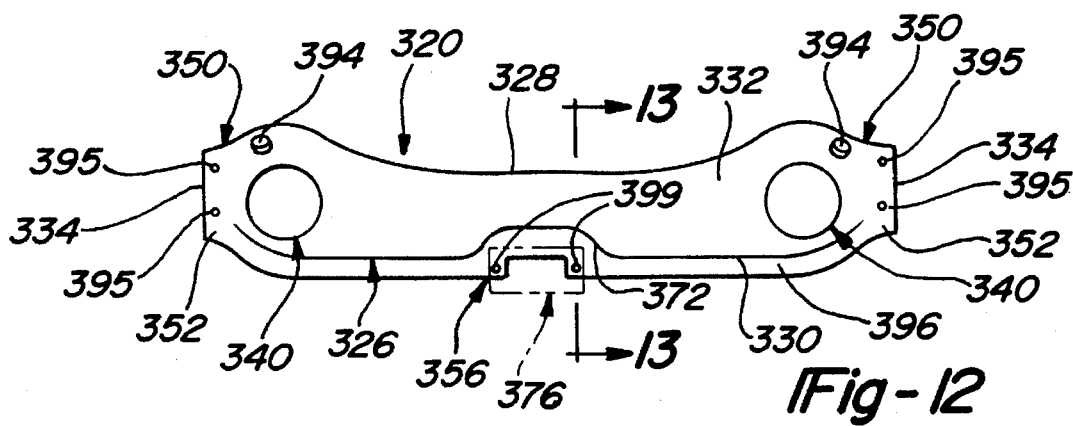
FIG. 12 is a bottom plan view of the cabinet assembly of FIG. 11.
Figure 13:
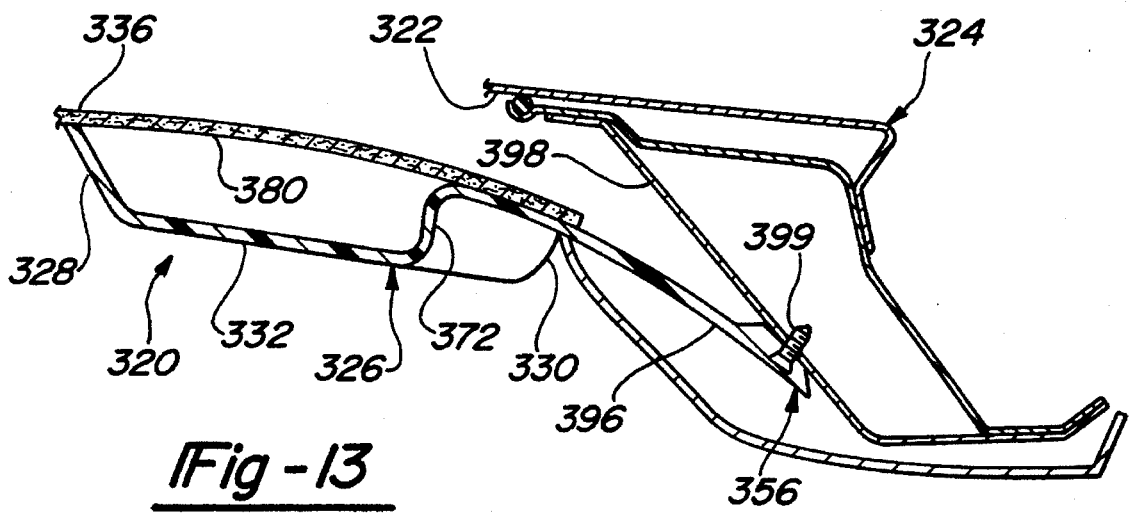
FIG. 13 is a cross-sectional view taken substantially along lines 13—13 of FIG. 12.

FIGS. 11–13 illustrate yet another embodiment of the subject cabinet assembly. Like structural features to those described in connection with FIGS. 1–8 above are designated with corresponding reference numerals, preceded by the numerical prefix "3".

The cabinet assembly 320 illustrated in FIGS. 11–13 is particularly adapted for use in vehicles having a rear garnish molding 392 and a dome/cargo light assembly 376 positioned along the rear garnish molding 392, such as the Jeep™ Cherokee ZJ. The cabinet assembly 320 is shown including a housing means 326 similar in construction to those embodiments described above. However, it will be appreciated that the housing means 326 is shaped differently than in those preceding embodiments to aesthetically conform to the interior of the particular vehicle 324. The loud speaker 340 is provided with auxiliary tweeters 394 for enhanced sound characteristics. Those skilled in the art will understand that the tweeters 394 can be provided on any of the embodiments of the cabinet assembly described above in connection with FIGS. 1–10.

The end mounting means 350, as best shown in FIGS. 11 and 12, includes flanges 352 having substantially less curvature than in those embodiments of the cabinet assembly described above. The flanges 352 are fastened to the interior of the vehicle 324, along the lateral edges of the roof 322, using threaded fasteners 395 due to a lack of side garnish moldings.

The intermediate mounting means 356 comprises an extended flange 396 projecting rearwardly from the rearward edge rim 338, best shown in the cross-sectional view of FIG. 13. During installation, the rear garnish molding 392 is removed from the vehicle 324, along with the dome/cargo light assembly 376. The extended flange 396 is optionally secured against a structural header 398, i.e., a D pillar, using a plurality of screws 399. Next, the end flanges 352 are fixed to the lateral edges of the roof 322 with the fasteners 395. Once the cabinet assembly 320 has been installed, the dome/cargo light assembly 376, along with rear garnish molding 392 is returned to position, with the dome/cargo light assembly 376 fitting in a provided dome/cargo light recess 372 and the OEM mounting screws 384 resecuring the dome/cargo light assembly 376 in place.

The various embodiments of the invention described with reference to all of the Figures above improve upon the prior art by providing proximal support to the housing means 26, 126, 226, 326 along its central or middle portion while establishing a pleasing visual impact of the cabinet assembly against the roof 22 or headliner portion 180, 280, 380 of the vehicle 24, 124, 224, 324. Therefore, structural integrity of the cabinet assembly 20, 120, 220, 320 is enhanced while eliminating unsightly gaps between the cabinet assembly 20, 120, 220, 320 and the headliner 180, 280, 380.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A loud speaker cabinet assembly for interior, overhead attachment beneath the headliner portion in a motor vehicle having a roof and garnish moldings along the interior edges of the roof, said assembly comprising: housing means for disposition beneath the headliner, said housing means including a bottom face and two spaced ends; end mounting means on each of said ends for supporting said housing means beneath the headliner; a loud speaker extending through said bottom face; an aperture in said bottom face generally midway between said ends; and fastener means received in said aperture for maintaining said housing means contiguous to the headliner; and a dome/cargo light assembly secured to said bottom face by said fastener means.

2. A cabinet assembly as set forth in claim 1 wherein said bottom face includes a dome/cargo light recess surrounding said aperture.

3. A cabinet assembly as set forth in claim 1 further including a tubular spacer extending from said housing means.

4. A cabinet assembly as set forth in claim 1 wherein said aperture comprises a screw hole.

5. A cabinet assembly as set forth in claim 1 wherein said fastener means includes a headliner nut.

6. A cabinet assembly as set forth in claim 5 wherein said fastener means includes an elongated screw and further including a tubular spacer surrounding said screw.

7. A cabinet assembly as set forth in claim 1 wherein said end mounting means comprises a curved flange extending from each of said ends.

* * * * *